(12) United States Patent
Yao

(10) Patent No.: US 11,151,993 B2
(45) Date of Patent: Oct. 19, 2021

(54) ACTIVATING VOICE COMMANDS OF A SMART DISPLAY DEVICE BASED ON A VISION-BASED MECHANISM

(71) Applicant: Baidu USA LLC, Sunnyvale, CA (US)

(72) Inventor: Xuchen Yao, Sunnyvale, CA (US)

(73) Assignee: BAIDU USA LLC, Sunnyvale, CA (US)

(*) Notice: Subject to any disclaimer, the term of this patent is extended or adjusted under 35 U.S.C. 154(b) by 103 days.

(21) Appl. No.: 16/235,538

(22) Filed: Dec. 28, 2018

(65) Prior Publication Data

US 2020/0211542 A1    Jul. 2, 2020

(51) Int. Cl.
- *G10L 15/22* (2006.01)
- *G06F 1/3231* (2019.01)
- *G06K 9/00* (2006.01)

(52) U.S. Cl.
CPC ............ *G10L 15/22* (2013.01); *G06F 1/3231* (2013.01); *G06K 9/00228* (2013.01); *G10L 2015/223* (2013.01); *G10L 2015/227* (2013.01)

(58) Field of Classification Search
None
See application file for complete search history.

(56) References Cited

U.S. PATENT DOCUMENTS

| | | | | |
|---|---|---|---|---|
| 8,676,273 B1* | 3/2014 | Fujisaki | ................ | H04M 3/533 455/567 |
| 9,298,974 B1* | 3/2016 | Kuo | ................... | G06K 9/00261 |
| 10,049,665 B2* | 8/2018 | Lee | .......................... | G10L 25/87 |
| 10,621,992 B2* | 4/2020 | Qian | ........................ | G10L 15/22 |
| 2003/0144844 A1* | 7/2003 | Colmenarez | ............ | G10L 15/24 704/273 |
| 2010/0060783 A1* | 3/2010 | Belt | ....................... | H04N 19/17 348/441 |
| 2011/0052139 A1* | 3/2011 | Oku | .................... | H04N 5/23218 386/224 |
| 2011/0285807 A1* | 11/2011 | Feng | ................... | H04N 5/23299 348/14.08 |
| 2012/0089392 A1* | 4/2012 | Larco | ..................... | G10L 15/063 704/231 |
| 2012/0179472 A1* | 7/2012 | Ryu | ........................ | G06F 3/017 704/275 |
| 2013/0021459 A1* | 1/2013 | Vasilieff | ................... | G10L 25/57 348/77 |
| 2013/0132095 A1* | 5/2013 | Murthi | ................... | G06F 1/3234 704/275 |

(Continued)

FOREIGN PATENT DOCUMENTS

| | | |
|---|---|---|
| JP | 11219421 A | 8/1999 |
| JP | 2009222969 A | 10/2009 |

(Continued)

*Primary Examiner* — Thuykhanh Le
(74) *Attorney, Agent, or Firm* — Womble Bond Dickinson (US) LLP

(57) ABSTRACT

An image is received from a light capture device associated with the smart display device. A determination is made as to whether to activate voice recognition of a recording device associated with the smart display device based on a face being in the image. In response to determining to activate the voice recognition of the recording device associated with the smart display device based on the face being in the image, the voice recognition of the recording device associated with the smart display device is activated.

17 Claims, 5 Drawing Sheets

(56) References Cited

U.S. PATENT DOCUMENTS

| | | | | |
|---|---|---|---|---|
| 2013/0190055 A1* | 7/2013 | Kulas | G06F 3/04883 | 455/566 |
| 2013/0304479 A1* | 11/2013 | Teller | G06F 3/0481 | 704/275 |
| 2014/0028826 A1* | 1/2014 | Lee | G10L 25/87 | 348/77 |
| 2015/0148011 A1* | 5/2015 | Chen | H04L 51/04 | 455/412.2 |
| 2015/0154983 A1* | 6/2015 | VanBlon | G10L 25/48 | 704/233 |
| 2015/0161992 A1* | 6/2015 | Jung | G10L 15/20 | 704/251 |
| 2015/0261972 A1* | 9/2015 | Lee | G06F 21/6218 | 713/165 |
| 2015/0302855 A1* | 10/2015 | Kim | G10L 15/08 | 704/275 |
| 2015/0370323 A1* | 12/2015 | Cieplinski | G06F 3/013 | 345/156 |
| 2016/0093081 A1* | 3/2016 | Kim | G06F 3/167 | 345/156 |
| 2016/0132290 A1* | 5/2016 | Raux | G06F 3/013 | 704/275 |
| 2016/0139662 A1* | 5/2016 | Dabhade | G06F 1/1686 | 345/156 |
| 2017/0330555 A1* | 11/2017 | Kawano | G06F 3/013 | |
| 2018/0025724 A1* | 1/2018 | Hunt | G06F 16/9535 | 704/270.1 |
| 2018/0025725 A1* | 1/2018 | Qian | G10L 15/02 | 704/257 |
| 2018/0025733 A1* | 1/2018 | Qian | G10L 15/22 | 704/275 |
| 2018/0137862 A1* | 5/2018 | Park | G06F 1/1684 | |
| 2018/0232591 A1* | 8/2018 | Hicks | G06K 9/00892 | |
| 2018/0276454 A1* | 9/2018 | Han | G06K 9/4628 | |
| 2018/0293236 A1* | 10/2018 | Xiang | G06F 16/433 | |
| 2019/0027147 A1* | 1/2019 | Diamant | G06F 16/3329 | |
| 2019/0058847 A1* | 2/2019 | Mayer | H04N 7/147 | |
| 2019/0080189 A1* | 3/2019 | Van Os | H04W 12/06 | |
| 2019/0089934 A1* | 3/2019 | Goulden | G08B 13/19684 | |
| 2019/0103125 A1* | 4/2019 | Jiang | H04R 23/008 | |
| 2019/0147156 A1* | 5/2019 | Burri | G06K 9/00597 | 713/186 |
| 2019/0179594 A1* | 6/2019 | Alameh | G06F 3/167 | |
| 2019/0289132 A1* | 9/2019 | Jung | H04M 7/0039 | |
| 2019/0325080 A1* | 10/2019 | Natarajan | G10L 15/22 | |
| 2019/0332846 A1* | 10/2019 | Wu | G06T 17/20 | |
| 2020/0005258 A1* | 1/2020 | Miller | G06F 40/205 | |
| 2020/0050846 A1* | 2/2020 | Sharma | G06N 3/08 | |
| 2020/0104720 A1* | 4/2020 | Bao | G06K 9/6256 | |
| 2020/0151432 A1* | 5/2020 | Zhu | G08B 13/181 | |
| 2020/0309930 A1* | 10/2020 | Zhou | G01S 15/32 | |
| 2021/0185160 A1* | 6/2021 | Ishimaru | H04M 1/72463 | |

FOREIGN PATENT DOCUMENTS

| | | |
|---|---|---|
| JP | 2015514254 A | 5/2015 |
| JP | 2016076007 A | 5/2016 |

* cited by examiner

ACTIVATING VOICE COMMANDS OF A SMART DISPLAY DEVICE BASED ON A VISION-BASED MECHANISM

TECHNICAL FIELD

Embodiments of the invention relate generally to smart display devices. More particularly, embodiments of the invention relate to activating voice commands of a smart display device based on a vision-based mechanism.

BACKGROUND

Smart display devices, such as Google Home Smart Display or Amazon Echo Show, can be voice assistant smart speakers that include an integrated display or touchscreen display to present a user with information. Commands and instructions are provided to the smart device either through voice commands from a user of the smart display device or by physical inputs of commands via the touchscreen display. The display of the smart display device can then present a user with information via the display based on the received command.

BRIEF DESCRIPTION OF THE DRAWINGS

Embodiments of the invention are illustrated by way of example and not limitation in the figures of the accompanying drawings in which like references indicate similar elements.

DETAILED DESCRIPTION

Figure 1:
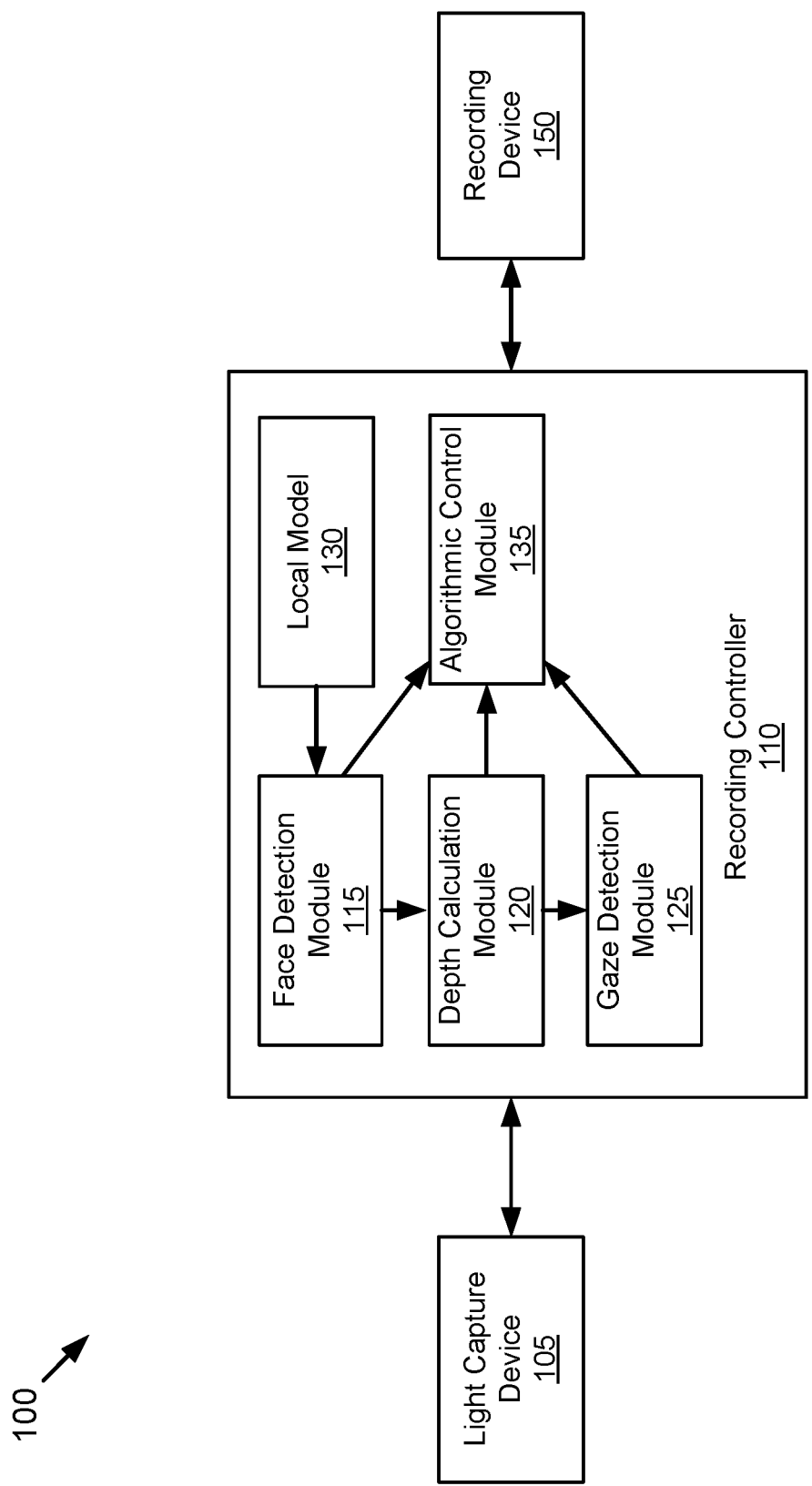
FIG. 1 is a block diagram illustrating an example of a display controller of a smart display device according to one embodiment.

Various embodiments and aspects of the invention will be described with reference to details discussed below, and the accompanying drawings will illustrate the various embodiments. The following description and drawings are illustrative of the invention and are not to be construed as limiting the invention. Numerous specific details are described to provide a thorough understanding of various embodiments of the present invention. However, in certain instances, well-known or conventional details are not described in order to provide a concise discussion of embodiments of the present inventions.

Reference in the specification to "one embodiment" or "an embodiment" means that a particular feature, structure, or characteristic described in conjunction with the embodiment can be included in at least one embodiment of the invention. The appearances of the phrase "in one embodiment" in various places in the specification do not necessarily all refer to the same embodiment.

Accordingly, embodiments of the invention provide a smart display device that activates voice commands of a smart display device based on a vision-based mechanism. Normally, smart display devices are activated using what is known as a wake word. For a user to provide a voice command to a smart display device, the user is required to first state the wake word to activate the smart display device followed by the desired command. For example, if a user wants the smart display device to display the weather, the user may say "Alexa, what's the weather today?" Upon identifying the wake word (e.g., Alexa), the smart display device may activate and perform a task based on the user's command (e.g., look up and present the weather to the user).

However, for a user to provide multiple commands to the smart display device, the user is required to use the wake word before each individual command. Such a process is cumbersome and may cause an undesirable user experience. Furthermore, a user may forget to use the wake word before each command, requiring the user to repeat commands to the smart display device.

Embodiments of the inventive system and methods provide a solution to this task by determining whether to activate a recording device of a smart display device based on a vision-based mechanism. A smart display device may include a light capture device, such as a camera, that can capture one or more images of the surroundings of the smart display device. For example, the camera may capture a video that includes a sequence of images of the environment in front of the smart display device. The light capture device provides the images to a recording controller of the smart display device.

The recording controller determines whether a face is present in the image received from the light capture device. The face being present in the image received by the light capture device may indicate that a user is using the smart display device. In embodiments, the recording controller may determine additional characteristics of the image, such as the depth of the face present in the image and the gaze direction of the face present in the image. The recording controller may determine whether or not to activate a recording device of the smart display device based on a face being present in the image. For example, the recording controller may activate voice recognition via the recording device. Upon activation, the recording device may receive voice commands from the user, which are provided to the smart display device for voice analysis (e.g., voice recognition) and subsequent performance of tasks based on the voice commands.

Accordingly, by using the presence of a face within an image captured by a smart display device, the recording controller of the smart display device may intelligently determine when to activate the voice recognition of the smart display device. By intelligently determining when to activate the voice recognition, a user is no longer required to use a wake word before providing a voice command to the smart display device, resulting in an improved user experience. Furthermore, intelligently activating/deactivating the voice recognition of the smart display device may prevent the activation of the voice recognition when a user is not present, reducing the power consumption of the smart display device.

FIG. 1 is a block diagram illustrating an example of a display controller of a smart display device 100 according to one embodiment. Referring to FIG. 1, smart display device 100 includes, but is not limited to, recording controller 110 operatively coupled to a light capture device 105 and a recording device 150. Recording controller 110 may be implemented in software, hardware, or a combination thereof. For example, at least some of the components of recording controller 110 may be loaded into a memory (e.g., random access memory or RAM such as dynamic RAM or DRAM) and executed by processing logic of one or more processors (e.g., microprocessors such as central processing units or CPUs, or general-purpose processing units or GPUs) of smart display device 100 (not shown).

The light capture device 105 may be configured to capture incoming light as images and transmit signals corresponding to the captured light to the recording controller 110. In embodiments, light capture device 105 be a camera operatively coupled to the recording controller 110. In embodiments, light capture device 105 may be a single camera. In some embodiments, light capture device 105 may be multiple cameras.

The recording controller 110 may include a face detection module 115. The face detection module 115 may be configured to identify one or more faces present in an image. In embodiments, the face detection module 115 may output a contour box of a face within the image along with a confidence level that the contour box corresponds to a face in the image. In some embodiments, the face detection module 115 may determine that a face is present in the image based on a local model 130 stored on the smart display device 100. For example, the face detection module 115 may make a comparison between an alleged face present in an image and a local model 130 to determine whether the alleged face present in the image is actually a face of a user. In embodiments, the local model 130 may correspond to an image of a user that has been previously registered and trained by the smart display device 100, as will be described in further detail at FIG. 3 below.

In some embodiments, the face detection module 115 may be configured to identify a particular user of a set of users. Each user of the set of users may provide one or more images to be used in a local model 130 for subsequent identification of each user in an image. For example, when user A is present in an image, the face detection module 115 may identify user A being present in the image by a probabilistic classification task.

The recording controller 110 may further include a depth calculation module 120. The depth calculation module 120 may be configured to determine the depth of a face in an image. The depth of the face may correspond to the distance between the face and the light capture device 105 of the smart display device 100. In some embodiments, the depth calculation module 120 may utilize multiple cameras to determine the depth of the face present in the image. For example, a first image captured by a first camera may be compared to a second image captured by a second camera at the same time to determine the depth of the face within the image. In embodiments including a single camera, the depth calculation module 120 may approximate an objects distance to the camera by determining a portion of the image occupied by the object. For example, if a person's face occupies 80% of an image, then the depth calculation module 120 may approximate that the person is in close proximity to the camera.

The recording controller 110 may include a gaze detection module 125. The gaze detection module 125 may be configured to detect whether a face in an image is looking at the light capture device 105 or the smart display device 100. In embodiments, the gaze detection module 125 may utilize one or more algorithms to detect the position of the faces' eyes within an image. The gaze detection module 125 may then determine whether the faces' eyes are looking in a direction towards the light capture device 105 or the smart display device 100.

In embodiments, the face detection module 115, the depth calculation module 120, and/or the gaze detection module 125 can operate in parallel. In some embodiments, the face detection module 115, the depth calculation module 120, and/or the gaze detection module 125 can operate in series. For example, the face detection module 115 may provide data to the depth calculation module 120 and the depth calculation module 120 may provide data to the gaze detection module 125.

The recording device 150 may be configured to capture incoming sound, such as voice commands. In embodiments, recording device 150 may be a microphone operatively coupled to the recording controller 110. In embodiments, recording device 150 may be a single microphone. In some embodiments, recording device 150 may be multiple microphones. For example, recording device 150 may be a microphone array that includes 2 to 8 microphones arranged in a linear, triangle, square or circular layout.

The recording controller 110 may further include an algorithmic control module 135. The algorithmic control module 135 may receive data from face detection module 115, depth calculation module 120 and/or gaze detection module 125. The algorithmic control module 135 may be configured to determine whether to activate or deactivate the recording device 150 of the smart display device 100 based on the received data. In embodiments, the algorithmic control module 135 may utilize a machine learning model to determine whether to activate or deactivate the recording device 150 and determine a confidence score. In an embodiment, the machine learning model may be received from a remote server, such as a cloud-based platform. Examples of machine learning models that may be utilized by the algorithmic control module 135 include, but are not limited to, linear models, non-linear models, shallow models and deep models. Upon the algorithmic control module 135 determining that the recording device 150 is to be activated/deactivated, the recording controller 110 may activate the recording device 150 based on the determination by transmitting a signal to the recording device 150.

Figure 2:
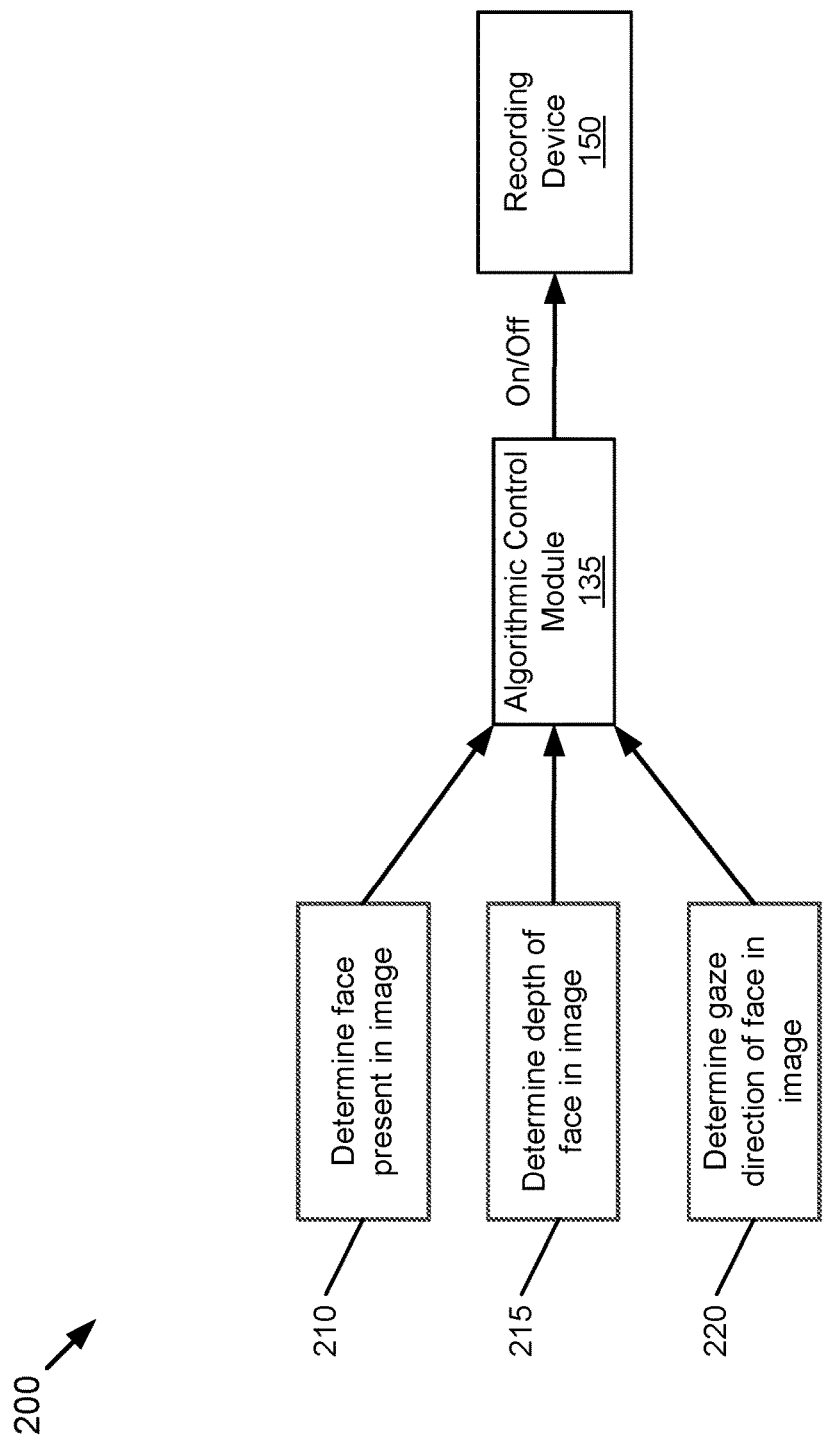
FIG. 2 is an illustration of an example of characteristics provided to an algorithmic control module to determine whether to activate a recording device of a smart display device in accordance with embodiments.

FIG. 2 is an illustration 200 of an example of characteristics provided to an algorithmic control module to determine whether to activate a recording device of a smart display device in accordance with embodiments. As previously described, characteristics associated with one or more images received from a light capture device may be provided to an algorithmic control module 135. The algorithmic control module 135 may use the received characteristics as inputs to a machine learning model which may determine whether to activate recording device 150 of a smart display device. Each of the characteristics may influence the determination of the machine learning model on whether or not to activate recording device 150.

At block 210, a recording controller may determine whether a face is present in image, as previously described. The algorithmic control module 135 may utilize the presence of a face in an image to determine whether or not to activate recording device 150. For example, if a face is present in the image, the probability that the algorithmic control module 135 determines to activate recording device 150 may increase.

At block 215, the recording controller may determine the depth of the face in the image. The algorithmic control module 135 may utilize the depth of a face in the image to determine whether or not to activate recording device 150.

In embodiments, if the distance from a face in the image to the smart display device is below a threshold distance, the probability that the algorithmic control module 135 determines to activate the recording device 150 may increase. For example, if a face of a user is within a 2 foot threshold distance from the smart display device, indicating the user is likely using the smart display device, then the probability that the algorithmic control module 135 determines to activate the recording device 150 may increase. In some embodiments, if the distance from a face of a user in the image to the smart display device exceeds a threshold distance, the probability that the algorithmic control module 135 determines to activate the recording device 150 may decrease. For example, if the distance of the face of the user to the smart display device is greater than a 20 foot threshold, the user is likely not using the smart display device. Accordingly, the probability that the algorithmic control module 135 determines to activate the recording device 150 may decrease.

At block 220, the recording controller may determine the gaze direction of the face in the image. The algorithmic control module 135 may utilize the gaze direction of a face in the image to determine whether or not to activate recording device 150. For example, if the gaze direction of a face of a user in the image is in a direction towards the smart display device, indicating the user is likely using the smart display device, then the probability that the algorithmic control module 135 determines to activate the recording device 150 may increase. However, if the gaze direction of a face of a user in the image is not in a direction towards the smart display device, indicating the person is not likely using the smart display device, then the probability that the algorithmic control module 135 determines to activate the recording device 150 may decrease.

It should be noted that although illustration 200 includes characteristics at blocks 210, 215 and 220 being utilized to determine whether or not to activate recording device 150, in embodiments more or less characteristics may be utilized to determine whether or not to activate recording device 150.

Figure 3:
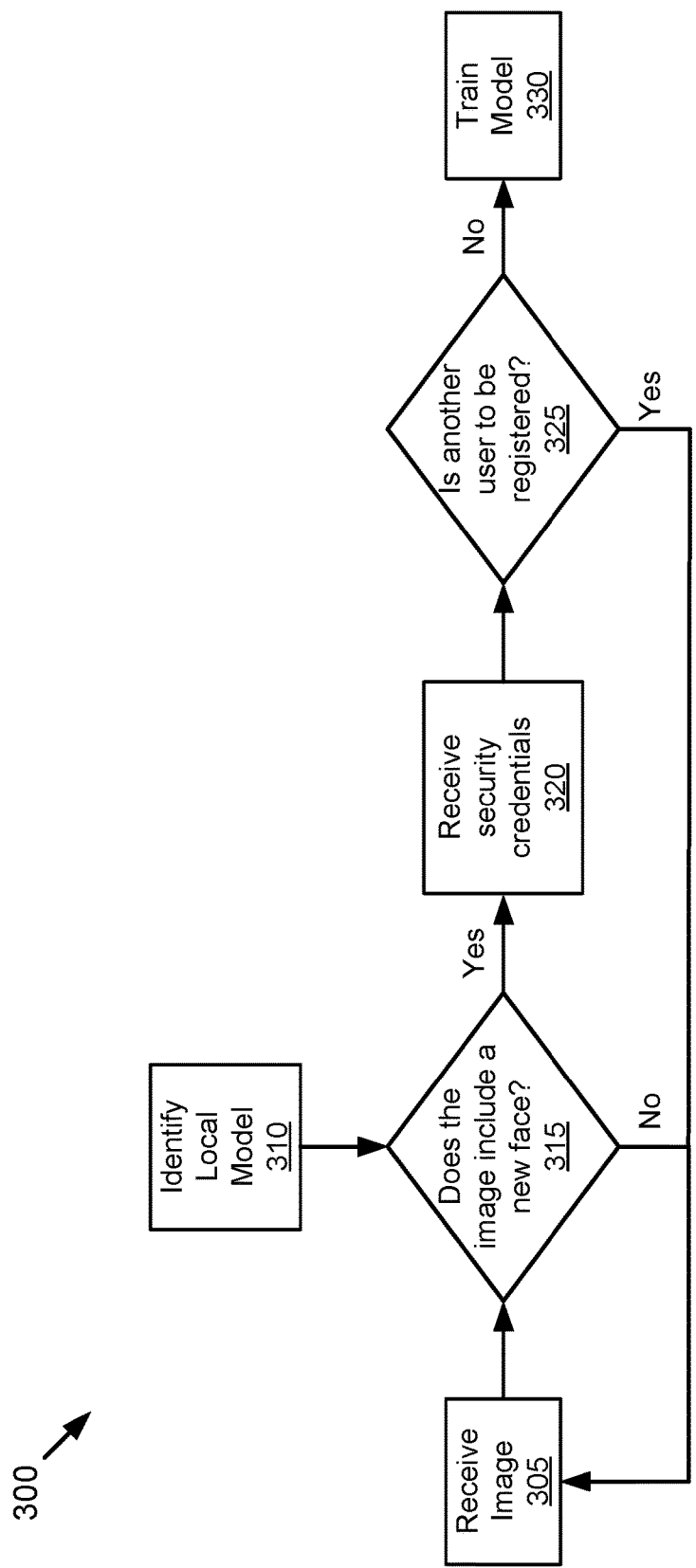
FIG. 3 is a flow diagram illustrating a process of generating a local model for a smart display device according to one embodiment.

FIG. 3 is a flow diagram illustrating a process 300 of generating a local model for a smart display device according to one embodiment. Process 300 may be performed by processing logic which may include software, hardware, or a combination thereof. For example, one or more operations of process 300 may be performed by the recording controller 110 of FIG. 1.

Referring to FIG. 3, in operation 305, processing logic receives an image from a light capture device. A face of a user may be present in the received image. In operation 310, processing logic identifies one or more local models stored on the smart display device. The local models may correspond to local model 130, as previously described FIG. 1.

In operation 315, processing logic determines if the image received at operation 305 includes a new face. The processing logic may compare the face in the received image with one or more local models to determine whether the image includes a new face. For example, if the face present in the received image does not correspond to one of the local models, then the image may include a new face that has not been registered with the smart device. If the image does not include a new face, then process 300 may return to operation 305 and a subsequent image may be received.

If the image includes a new face, in operation 320, processing logic receives security credentials for the smart display device. For example, the processing logic may prompt a user of the smart display device for a username and password for the smart display device or any other type of security credential for the smart display device. Upon receiving the security credentials, the smart display device may register the new user as a user of the smart display device. Registering the new user may include assigning a username to the new user, assigning privileges to the new user, assigning preferences to the new user, etc.

In some embodiments, if the user is unable to provide the security credentials to the smart display device, the user may be able to use the smart display device in a guest mode. When operating in guest mode, the user may have a lower level of privileges compared to a registered user. For example, while operating in guest mode a user may be able to access the weather or news, but may not be able to access personal information stored on the smart display device or make purchases.

In operation 325, the processing logic determines if another user is to be registered with the smart display device. The processing logic may determine if another user is to be registered by providing a prompt, such as a voice prompt or prompt on the display of the smart display device, asking the user if another user is to be registered. If another user is to be registered, process 300 returns to operation 305 and process 300 is repeated for the other user.

If no other users are to be registered with the smart display device, in operation 330, a local model for the new user is trained by processing logic of the smart display device. In some embodiments, the image may be provided to a remote server, such as a cloud-based platform, and the remote server may train the local model for the new user and transmit the trained local model to the smart display device. Prior to providing the image to the remote server, the smart display device may acquire permission from the user to provide the image to the remote server for the generation and training of the local model. The trained local model may then be used by the smart display system, as previously described at FIG. 1.

Figure 4:
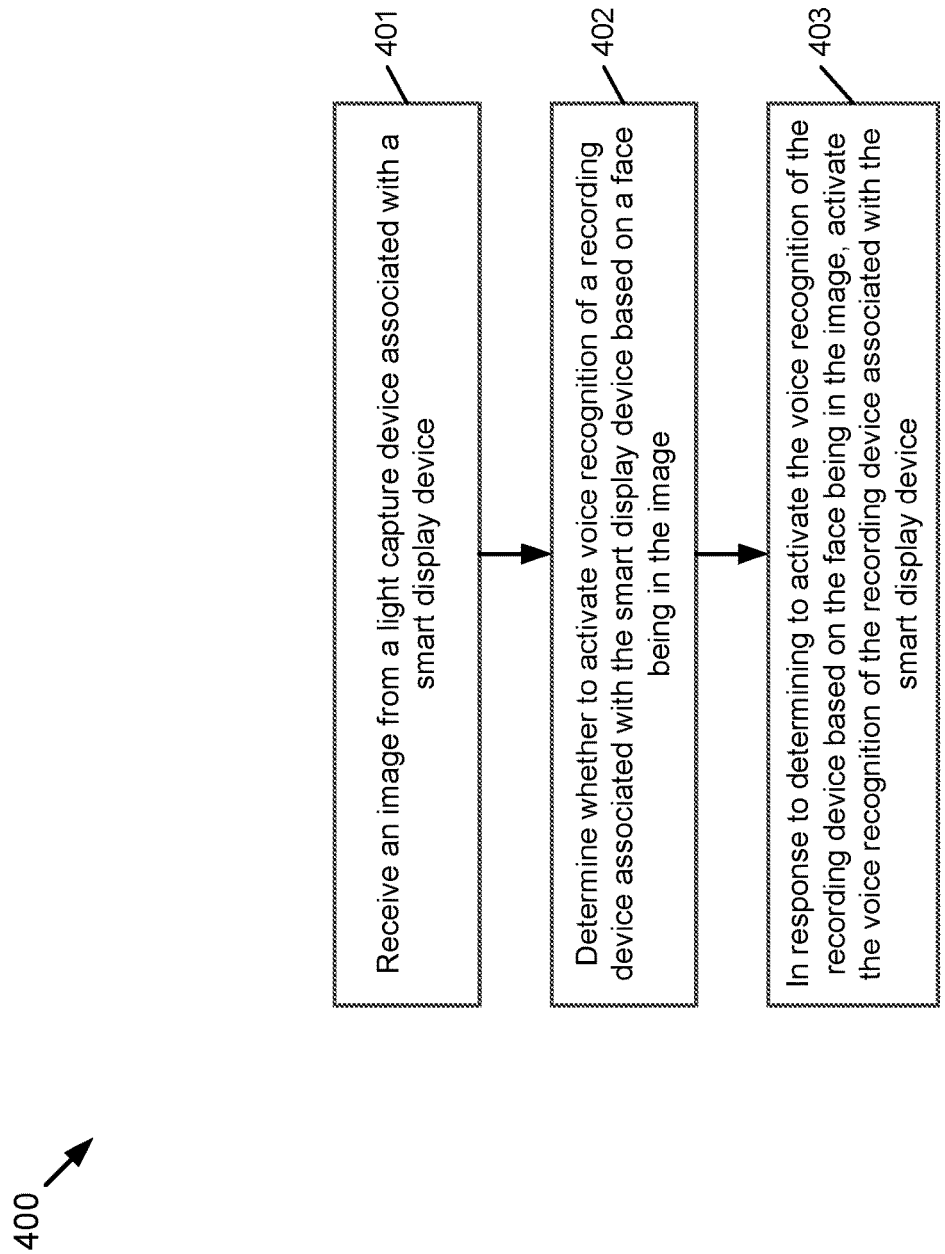
FIG. 4 is a flow diagram illustrating a process of determining to activate a recording device of a smart display device based on a face being in an image according to one embodiment.

FIG. 4 is a flow diagram illustrating a process 400 of determining to activate a recording device of a smart display device based on a face being in an image according to one embodiment. Process 400 may be performed by processing logic which may include software, hardware, or a combination thereof. For example, process 400 may be performed by recording controller 110 of FIG. 1. Referring to FIG. 4, in operation 401, processing logic receives an image from a light capture device associated with a smart display device. In operation 402, processing logic determines whether to activate a recording device associated with the smart display device based on a face being in the image. In response to determining to activate the recording device based on the face being in the image, in operation 403, processing logic activates the voice recognition of the recording device associated with the smart display device. Upon activating the voice recognition, the recording device may receive voice commands from a user which may be transmitted to the processing logic for analysis and subsequent performance of tasks based on the voice commands.

In embodiments, processing logic may receive one or more subsequent images from the light capture device. Upon receiving the subsequent images, the processing logic may determine if the face is in the subsequent image. If the face is not in the subsequent image, then the processing logic may deactivate the recording device. For example, if a user's face is no longer present in a subsequent image, the user may no longer be using the smart display device. Accordingly, the processing logic may determine to deactivate the recording device.

Figure 5:
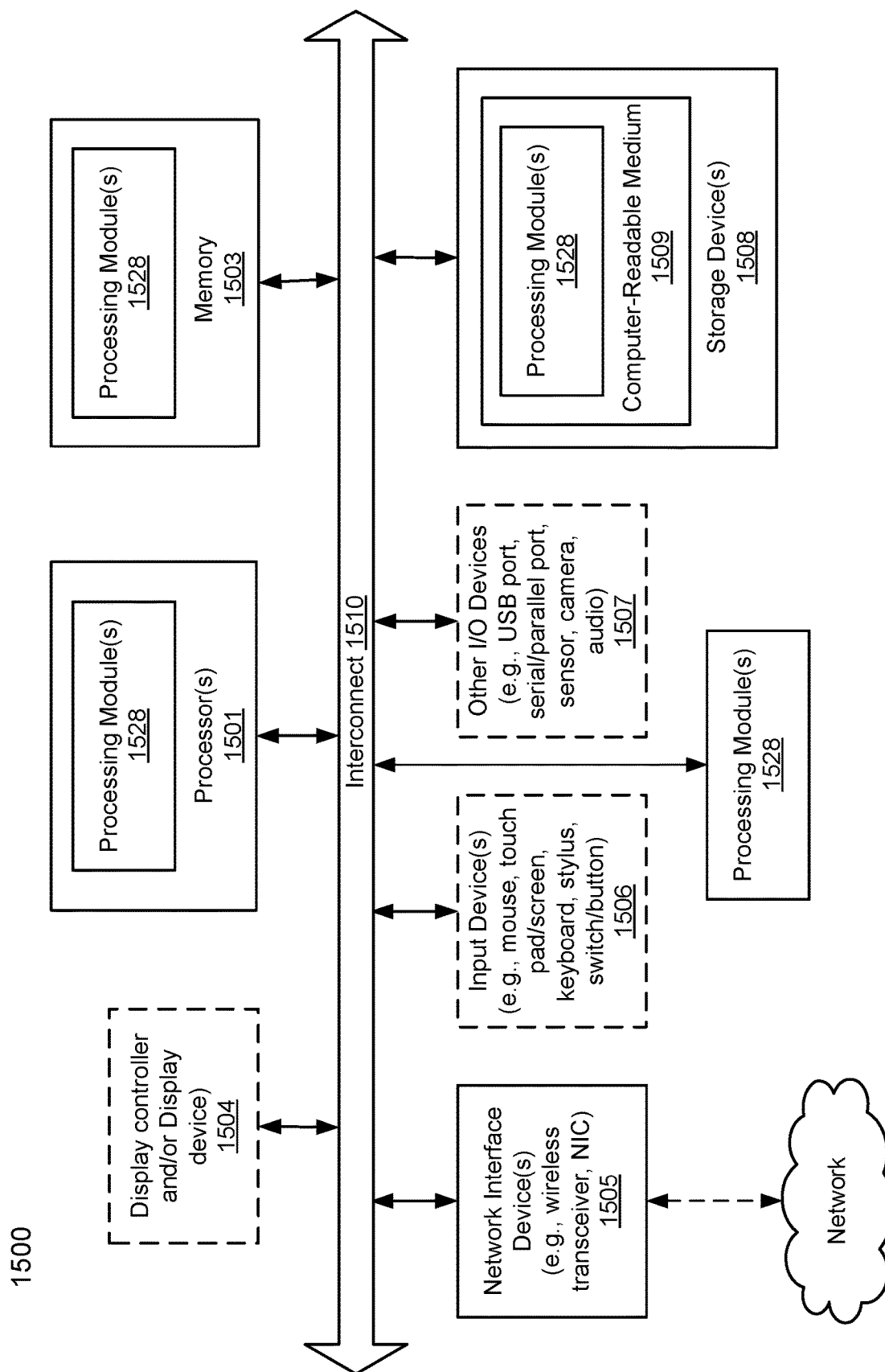
FIG. 5 is a block diagram illustrating a data processing system according to one embodiment.

FIG. 5 is a block diagram illustrating an example of a data processing system which may be used with one embodiment of the invention. For example, system 1500 may represent any of data processing systems described above performing any of the processes or methods described above, such as, for example, a client device or a server described above, such as, for example, smart display device 100 of FIG. 1 as described above.

System 1500 can include many different components. These components can be implemented as integrated circuits (ICs), portions thereof, discrete electronic devices, or other modules adapted to a circuit board such as a motherboard or add-in card of the computer system, or as components otherwise incorporated within a chassis of the computer system.

Note also that system 1500 is intended to show a high level view of many components of the computer system. However, it is to be understood that additional components may be present in certain implementations and furthermore, different arrangement of the components shown may occur in other implementations. System 1500 may represent a desktop, a laptop, a tablet, a server, a mobile phone, a media player, a personal digital assistant (PDA), a Smartwatch, a personal communicator, a gaming device, a network router or hub, a wireless access point (AP) or repeater, a set-top box, or a combination thereof. Further, while only a single machine or system is illustrated, the term "machine" or "system" shall also be taken to include any collection of machines or systems that individually or jointly execute a set (or multiple sets) of instructions to perform any one or more of the methodologies discussed herein.

In one embodiment, system 1500 includes processor 1501, memory 1503, and devices 1505-1508 via a bus or an interconnect 1510. Processor 1501 may represent a single processor or multiple processors with a single processor core or multiple processor cores included therein. Processor 1501 may represent one or more general-purpose processors such as a microprocessor, a central processing unit (CPU), or the like. More particularly, processor 1501 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. Processor 1501 may also be one or more special-purpose processors such as an application specific integrated circuit (ASIC), a cellular or baseband processor, a field programmable gate array (FPGA), a digital signal processor (DSP), a network processor, a graphics processor, a network processor, a communications processor, a cryptographic processor, a co-processor, an embedded processor, or any other type of logic capable of processing instructions.

Processor 1501, which may be a low power multi-core processor socket such as an ultra-low voltage processor, may act as a main processing unit and central hub for communication with the various components of the system. Such processor can be implemented as a system on chip (SoC). Processor 1501 is configured to execute instructions for performing the operations and steps discussed herein. System 1500 may further include a graphics interface that communicates with optional graphics subsystem 1504, which may include a display controller, a graphics processor, and/or a display device.

Processor 1501 may communicate with memory 1503, which in one embodiment can be implemented via multiple memory devices to provide for a given amount of system memory. Memory 1503 may include one or more volatile storage (or memory) devices such as random access memory (RAM), dynamic RAM (DRAM), synchronous DRAM (SDRAM), static RAM (SRAM), or other types of storage devices. Memory 1503 may store information including sequences of instructions that are executed by processor 1501, or any other device. For example, executable code and/or data of a variety of operating systems, device drivers, firmware (e.g., input output basic system or BIOS), and/or applications can be loaded in memory 1503 and executed by processor 1501. An operating system can be any kind of operating systems, such as, for example, Windows® operating system from Microsoft®, Mac OS®/iOS® from Apple, Android® from Google®, Linux®, Unix®, or other real-time or embedded operating systems such as VxWorks.

System 1500 may further include IO devices such as devices 1505-1508, including network interface device(s) 1505, optional input device(s) 1506, and other optional IO device(s) 1507. Network interface device 1505 may include a wireless transceiver and/or a network interface card (NIC). The wireless transceiver may be a WiFi transceiver, an infrared transceiver, a Bluetooth transceiver, a WiMax transceiver, a wireless cellular telephony transceiver, a satellite transceiver (e.g., a global positioning system (GPS) transceiver), or other radio frequency (RF) transceivers, or a combination thereof. The NIC may be an Ethernet card.

Input device(s) 1506 may include a mouse, a touch pad, a touch sensitive screen (which may be integrated with display device 1504), a pointer device such as a stylus, and/or a keyboard (e.g., physical keyboard or a virtual keyboard displayed as part of a touch sensitive screen). For example, input device 1506 may include a touch screen controller coupled to a touch screen. The touch screen and touch screen controller can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen.

IO devices 1507 may include an audio device. An audio device may include a speaker and/or a microphone to facilitate voice-enabled functions, such as voice recognition, voice replication, digital recording, and/or telephony functions. Other IO devices 1507 may further include universal serial bus (USB) port(s), parallel port(s), serial port(s), a printer, a network interface, a bus bridge (e.g., a PCI-PCI bridge), sensor(s) (e.g., a motion sensor such as an accelerometer, gyroscope, a magnetometer, a light sensor, compass, a proximity sensor, etc.), or a combination thereof. Devices 1507 may further include an imaging processing subsystem (e.g., a camera), which may include an optical sensor, such as a charged coupled device (CCD) or a complementary metal-oxide semiconductor (CMOS) optical sensor, utilized to facilitate camera functions, such as recording photographs and video clips. Certain sensors may be coupled to interconnect 1510 via a sensor hub (not shown), while other devices such as a keyboard or thermal sensor may be controlled by an embedded controller (not shown), dependent upon the specific configuration or design of system 1500.

To provide for persistent storage of information such as data, applications, one or more operating systems and so forth, a mass storage (not shown) may also couple to processor 1501. In various embodiments, to enable a thinner and lighter system design as well as to improve system responsiveness, this mass storage may be implemented via a solid state device (SSD). However in other embodiments, the mass storage may primarily be implemented using a hard disk drive (HDD) with a smaller amount of SSD storage to act as a SSD cache to enable non-volatile storage of context state and other such information during power down events so that a fast power up can occur on re-initiation of system activities. Also a flash device may be coupled to processor 1501, e.g., via a serial peripheral interface (SPI). This flash device may provide for non-volatile storage of system software, including a basic input/output software (BIOS) as well as other firmware of the system.

Storage device 1508 may include computer-accessible storage medium 1509 (also known as a machine-readable storage medium or a computer-readable medium) on which is stored one or more sets of instructions or software (e.g., module, unit, and/or logic 1528) embodying any one or more of the methodologies or functions described herein. Processing module/unit/logic 1528 may represent any of the components described above, such as, for example, recording controller 110 as described above. Processing module/unit/logic 1528 may also reside, completely or at least partially, within memory 1503 and/or within processor 1501 during execution thereof by data processing system 1500, memory 1503 and processor 1501 also constituting machine-accessible storage media. Processing module/unit/logic 1528 may further be transmitted or received over a network via network interface device 1505.

Computer-readable storage medium 1509 may also be used to store the some software functionalities described above persistently. While computer-readable storage medium 1509 is shown in an exemplary embodiment to be a single medium, the term "computer-readable storage medium" should be taken to include a single medium or multiple media (e.g., a centralized or distributed database, and/or associated caches and servers) that store the one or more sets of instructions. The terms "computer-readable storage medium" shall also be taken to include any medium that is capable of storing or encoding a set of instructions for execution by the machine and that cause the machine to perform any one or more of the methodologies of the present invention. The term "computer-readable storage medium" shall accordingly be taken to include, but not be limited to, solid-state memories, and optical and magnetic media, or any other non-transitory machine-readable medium.

Processing module/unit/logic 1528, components and other features described herein can be implemented as discrete hardware components or integrated in the functionality of hardware components such as ASICS, FPGAs, DSPs or similar devices. In addition, processing module/unit/logic 1528 can be implemented as firmware or functional circuitry within hardware devices. Further, processing module/unit/logic 1528 can be implemented in any combination hardware devices and software components.

Note that while system 1500 is illustrated with various components of a data processing system, it is not intended to represent any particular architecture or manner of interconnecting the components; as such details are not germane to embodiments of the present invention. It will also be appreciated that network computers, handheld computers, mobile phones, servers, and/or other data processing systems which have fewer components or perhaps more components may also be used with embodiments of the invention.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The techniques shown in the figures can be implemented using code and data stored and executed on one or more electronic devices. Such electronic devices store and communicate (internally and/or with other electronic devices over a network) code and data using computer-readable media, such as non-transitory computer-readable storage media (e.g., magnetic disks; optical disks; random access memory; read only memory; flash memory devices; phase-change memory) and transitory computer-readable transmission media (e.g., electrical, optical, acoustical or other form of propagated signals—such as carrier waves, infrared signals, digital signals).

The processes or methods depicted in the preceding figures may be performed by processing logic that comprises hardware (e.g. circuitry, dedicated logic, etc.), firmware, software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

In the foregoing specification, embodiments of the invention have been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

What is claimed is:

1. A computer-implemented method for control of a smart display device based on characteristics, the method comprising:
   receiving an image and a reference image from a light capture device associated with the smart display device, wherein the light capture device includes a camera and a reference camera, wherein the image is captured by the camera and the reference image is captured by the reference camera;
   determining, by utilizing a machine learning model to analyze the image, whether to activate voice recognition of a recording device associated with the smart display device based on a face being in the image, wherein the machine learning model is trained locally by the smart display device;
   determining whether a portion of the image occupied by the face is greater than a threshold portion;

determining a depth of the face in the image by comparing the image and the reference image captured at a same time, if the portion of the image occupied by the face is greater the threshold portion, determining whether the face is in close proximity to the light capture device based on the depth of the face in the image; and in response to determining the face is in close proximity to the light capture device, activating the voice recognition of the recording device associated with the smart display device.

2. The method of claim 1, further comprising:

receiving a second image from the light capture device associated with the smart display device;

determining whether the face is in the second image; and in response to determining that the face is not in the second image, deactivating the voice recognition of the recording device associated with the smart display device.

3. The method of claim 1, wherein determining whether to activate the voice recognition of the recording device associated with the smart display device further comprises:

determining a distance from the face in the image to the smart display device.

4. The method of claim 1, wherein determining whether to activate the voice recognition of the recording device associated with the smart display device further comprises:

determining a gaze direction of the face in the image relative to the smart display device.

5. The method of claim 1, further comprising:

identifying a user associated with the face.

6. The method of claim 5, wherein identifying the user associated with the face is based on a comparison of the face present in the image with a face of the user present in a local model.

7. A non-transitory machine-readable medium having instructions stored therein, which when executed by a processor, cause the processor to perform operations, the operations comprising:

receiving an image and a reference image from a light capture device associated with a smart display device, wherein the light capture device includes a camera and a reference camera, wherein the image is captured by the camera and the reference image is captured by the reference camera;

determining, by utilizing a machine learning model to analyze the image, whether to activate voice recognition of a recording device associated with the smart display device based on a face being in the image, wherein the machine learning model is trained locally by the smart display device;

determining whether a portion of the image occupied by the face is greater than a threshold portion;

determining a depth of the face in the image by comparing the image and the reference image captured at a same time;

if the portion of the image occupied by the face is greater the threshold portion, determining whether the face is in close proximity to the light capture device based on the depth of the face in the image; and in response to determining the face is in close proximity to the light capture device, activating the voice recognition of the recording device associated with the smart display device.

8. The non-transitory machine-readable medium of claim 7, further comprising:

receiving a second image from the light capture device associated with the smart display device;

determining whether the face is in the second image; and in response to determining that the face is not in the second image, deactivating the voice recognition of the recording device associated with the smart display device.

9. The non-transitory machine-readable medium of claim 7, wherein determining whether to activate the voice recognition of the recording device associated with the smart display device further comprises:

determining a distance from the face in the image to the smart display device.

10. The non-transitory machine-readable medium of claim 7, wherein determining whether to activate the voice recognition of the recording device associated with the smart display device further comprises:

determining a gaze direction of the face in the image relative to the smart display device.

11. The non-transitory machine-readable medium of claim 7, further comprising:

identifying a user associated with the face.

12. The non-transitory machine-readable medium of claim 11, wherein identifying the user associated with the face is based on a comparison of the face present in the image with a face of the user present in a local model.

13. A system, comprising:

a processor; and a memory coupled to the processor to store instructions, which when executed by the processor, cause the processor to perform operations, the operations including:

receiving an image and a reference image from a light capture device associated with a smart display device, wherein the light capture device includes a camera and a reference camera, wherein the image is captured by the camera and the reference image is captured by the reference camera;

determining, by utilizing a machine learning model to analyze the image, whether to activate voice recognition of a recording device associated with the smart display device based on a face being in the image, wherein the machine learning model is trained locally by the smart display device;

determining whether a portion of the image occupied by the face is greater than a threshold portion;

determining a depth of the face in the image by comparing the image and the reference image captured at a same time;

if the portion of the image occupied by the face is greater the threshold portion, determining whether the face is in close proximity to the light capture device based on the depth of the face in the image; and in response to determining the face is in close proximity to the light capture device, activating the voice recognition of the recording device associated with the smart display device.

14. The system of claim 13, further comprising:

receiving a second image from the light capture device associated with the smart display device;

determining whether the face is in the second image; and in response to determining that the face is not in the second image, deactivating the voice recognition of the recording device associated with the smart display device.

15. The system of claim 13, wherein determining whether to activate the voice recognition of the recording device associated with the smart display device further comprises:
   determining a distance from the face in the image to the smart display device.

16. The system of claim 13, wherein determining whether to activate the voice recognition of the recording device associated with the smart display device further comprises:
   determining a gaze direction of the face in the image relative to the smart display device.

17. The system of claim 13, further comprising:
   identifying a user associated with the face.

* * * * *